United States Patent
Wang (10) Patent No.: US 9,852,338 B2
(45) Date of Patent: Dec. 26, 2017

(54) BIOMETRIC IMAGING METHOD AND DEVICE

(71) Applicant: EYESMART TECHNOLOGY LTD., Beijing (CN)

(72) Inventor: Xiaopeng Wang, Beijing (CN)

(73) Assignee: EYESMART TECHNOLOGY LTD., Beijing (CN)

( * ) Notice: Subject to any disclaimer, the term of this patent is extended or adjusted under 35 U.S.C. 154(b) by 159 days.

(21) Appl. No.: 14/648,368

(22) PCT Filed: Mar. 26, 2014

(86) PCT No.: PCT/CN2014/000330
§ 371 (c)(1),
(2) Date: May 29, 2015

(87) PCT Pub. No.: WO2015/058460
PCT Pub. Date: Apr. 30, 2015

(65) Prior Publication Data
US 2015/0310272 A1    Oct. 29, 2015

(30) Foreign Application Priority Data

Oct. 21, 2013  (CN) .......................... 2013 1 0494298

(51) Int. Cl.
G06K 9/00  (2006.01)
H04N 5/33  (2006.01)
(Continued)

(52) U.S. Cl.
CPC ........... *G06K 9/00604* (2013.01); *G02B 7/28* (2013.01); *G06K 9/0061* (2013.01);
(Continued)

(58) Field of Classification Search
CPC .... G06K 9/00604; G06K 9/0061; G02B 7/28; H04N 5/23212; H04N 5/332
See application file for complete search history.

(56) References Cited

U.S. PATENT DOCUMENTS

2008/0050108 A1* 2/2008 Mizutani ................ G02B 7/36
396/104
2009/0067041 A1* 3/2009 Izumi ..................... G02B 13/14
359/356
(Continued)

FOREIGN PATENT DOCUMENTS

CN          1464323 A      12/2003
CN        102855476 A       1/2013
(Continued)

OTHER PUBLICATIONS

Gong et al, "An Optimized Wavelength Band Selection for Heavily Pigmented Iris Recognition", Jan. 2013, IEEE Transactions on Information Forensics and Security, vol. 8, No. 1, pp. 64-75.*
(Continued)

Primary Examiner — David F Dunphy
(74) Attorney, Agent, or Firm — Myers Bigel, P.A.

(57) ABSTRACT

It is an objective of the present invention to provide a biometric imaging device comprising an optical lens component for performing optical imaging (including static image and dynamic image) on a biometric of a region of interest; an image sensor for converting an optical image of said biometric into an electronic image (including static image and dynamic image); and a micromotor controller for acquiring, delivering, or analyzing image quality information of the electronic image, analyzing in real time the definition of the image according to the image quality information of the electronic image, and feeding back said information in real time so as to adjust the optical lens
(Continued)

component to perform autofocus control of the biometric of the region of interest.

25 Claims, 4 Drawing Sheets

(51) Int. Cl.
    *H04N 5/232* (2006.01)
    *G02B 7/28* (2006.01)
    *G02B 3/14* (2006.01)

(52) U.S. Cl.
    CPC ......... *H04N 5/23212* (2013.01); *H04N 5/332* (2013.01); *G02B 3/14* (2013.01)

(56) References Cited

U.S. PATENT DOCUMENTS

| | | | |
|---|---|---|---|
| 2010/0073549 A1* | 3/2010 | Sekine | G03B 13/32 348/345 |
| 2010/0183199 A1* | 7/2010 | Smith | G06F 19/322 382/117 |
| 2013/0089240 A1 | 4/2013 | Northcott et al. | |
| 2013/0100025 A1* | 4/2013 | Vernacchia | G06F 3/013 345/168 |
| 2014/0111650 A1* | 4/2014 | Georgiev | G06T 3/4038 348/159 |

FOREIGN PATENT DOCUMENTS

| | | |
|---|---|---|
| CN | 103136421 A | 6/2013 |
| CN | 103593647 A | 2/2014 |

OTHER PUBLICATIONS

International Search Report corresponding to International Application No. PCT/CN2014/000330 dated Jul. 16, 2014.
Chinese Office Action corresponding to Chinese Application No. 201310494298.1 dated Apr. 13, 2016.
Extended European Search Report corresponding to European Application No. 14856525.2 dated Oct. 10, 2016.
Chinese Office Action corresponding to Chinese Application No. 201310494298.1 dated Oct. 26, 2016.
Roberts et al. "Multispectral diagnostic imaging of the iris in pigment dispersion syndrome" *Journal of Glaucoma* 21(6):351-357 (2012).
Ross "Iris recognition: The path forward" *Computer* 43(2):30-35 (2010).
Examination Report corresponding to European Application No. 14856525.2 dated Aug. 2, 2017.
Boyce et al. "Multispectral Iris Analysis: A Preliminary Study", Appeared in Proceedings of Computer Vision and Pattern Recognition Workshop on Biometrics (CVPRW) (2006) 9 pages.
Decision on Rejection corresponding to Chinese Application No. 201310494298.1 dated Aug. 11,2017.

* cited by examiner

Fig.1

Fig.2 receiving an image of a biometric of a region of interest as captured by the optical lens component
310 acquiring image quality information of said image
320 controlling a micromotor to adjust the optical lens component according to the image quality information of said image so as to perform autofocus control of the biometric of said region of interest
330

Fig.5 segmenting and positioning both eyes as two separate monocular iris images of left and right eyes

Fig.6

BIOMETRIC IMAGING METHOD AND DEVICE

RELATED APPLICATIONS

This application is a 35 U.S.C. §371 national phase application of PCT Application PCT/CN2014/000330 filed Mar. 26, 2014 which claims priority to Chinese Application No. 201310494298.1 filed Oct. 21, 2013. The entire content of each is incorporated herein by reference in its entirety.

FIELD OF THE INVENTION

The present invention relates to the field of optical technologies, in particular to a technology for imaging of a biometric.

BACKGROUND OF THE INVENTION

Iris recognition is a rising biometric identification technology and extends its application in the identity recognition field. Safe and convenient identity recognition is the difficulty of developing services for mobile terminal business. Currently, use of mobile terminals as measures for identity recognition mainly depends on password and card, which is difficult to remember, easy to steal and low in safety. In numerous identity recognition technologies, iris recognition has the highest safety and precision, and possesses the advantages such as being unique for individuals, not needing to be remembered, being unable to be stolen, having a high safety level, and so on.

In the prior art, iris imaging design generally employs fixed focus design. The user needs to voluntarily cooperate to seek a suitable iris imaging position, so that additional hardware devices such as a distance-measuring sensor, a three-color indicator light, etc. are required. There are some iris imaging systems using a stepping motor or direct-current motor to drive the lens to move back and forth so as to achieve iris autofocus and imaging, but they still need a distance-measuring sensor to measure the distance; moreover, the stepping motor or direct-current motor has high power consumption due to a large volume. These all lead to great increase in the volume of the iris imaging system, extension in recognition speed, and poor user experience. It is impossible to miniaturize and integrate it into mobile terminals which are widely required.

SUMMARY OF THE INVENTION

It is an objective of the present disclosure to provide a biometric imaging method and device as well as a mobile terminal comprising said device, thereby alleviating or eliminating one or more problems as mentioned above.

According to one aspect of the present disclosure, a biometric imaging device is provided, wherein said device comprises:

an optical lens component for optically imaging a biometric of a region of interest;

an image sensor for converting an optical image comprising said biometric into an electronic image;

a micromotor for adjusting said optical lens component; and a micromotor controller for acquiring image quality information of said electronic image, and controlling said micromotor to adjust said optical lens component according to the image quality information of said electronic image so as to perform autofocus control of the biometric of said region of interest.

According to another aspect of the present disclosure, a mobile terminal is further provided, wherein said mobile terminal comprises the biometric imaging device as stated above.

According to a further aspect of the present disclosure, a biometric imaging method is further provided, wherein said method comprises the following steps:

acquiring an image of a biometric of a region of interest as captured by an optical lens component;

acquiring image quality information of said image; and controlling a micromotor to adjust the optical lens component according to the image quality information of said image so as to perform autofocus control of the biometric of said region of interest.

As compared with the prior art, the present disclosure can perform autofocus control of said biometric according to the image quality information of the electronic image of the biometric, while avoid traditional autofocus by measuring a physical distance between the imaging device and the photographed object, needless to configure hardware such as distance-measuring sensor required for distance measurement. In addition, the present disclosure employs a micromotor instead of the stepping motor or direct-current motor to adjust the optical lens component. These all provide the possibility of miniaturization of a biometric imaging device.

BRIEF DESCRIPTION OF THE DRAWINGS

By reading the detailed description of non-limiting embodiments as made with reference to the following figures, other features, purposes and advantages of the present invention will become clearer.

The same or similar reference signs in the figures represent the same or similar components.

DETAILED DESCRIPTION OF THE INVENTION

Those skilled in the art shall understand that the present invention can be carried out in other ways apart from these specific details. Moreover, to not make the present invention vague, unessential details of known functions and structures are omitted from the current description.

The present disclosure is further described in detail in combination with the figures.

Figure 1:
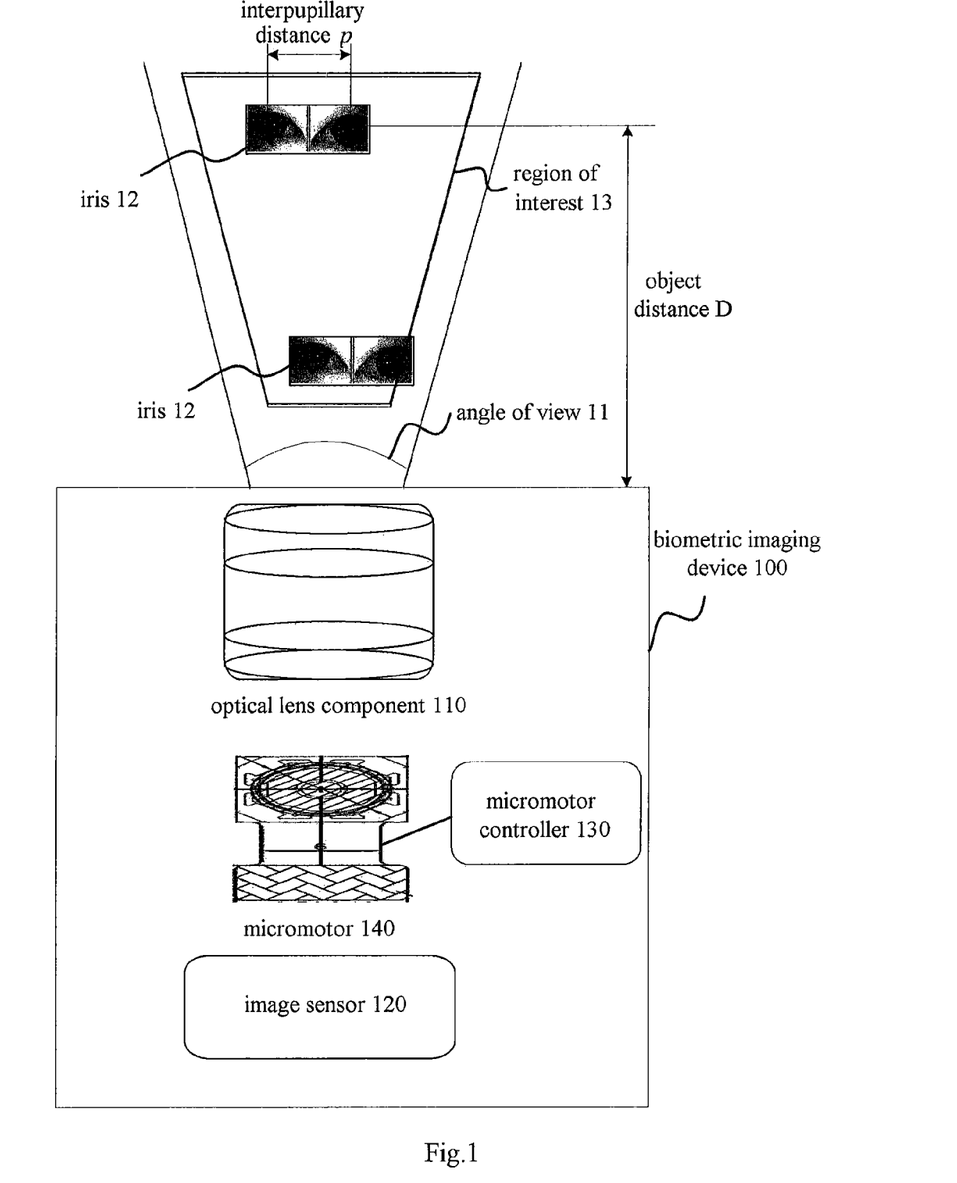
FIG. 1 shows a schematic diagram of a biometric imaging device according to one aspect of the present disclosure.

FIG. 1 shows a schematic diagram of a biometric imaging device according to one aspect of the present disclosure. As shown in FIG. 1, a biometric imaging device 100 comprises an optical lens component 110, an image sensor 120, a micromotor 140 and a micromotor controller 130.

The optical lens component 110 is used for optical imaging of a biometric 12 of a region of interest 13.

Specifically, the optical lens component 110 may be a set of optical lenses, which implements imaging of biometric information in a fixed imaging focal plane. The materials of the set of optical lenses may employ all-glass lens, all-plastic lens, and mixed material such as a combination of glass lens and plastic lens or liquid lens. Herein, iris is used as an example of the biometric to describe the embodiments of the present disclosure. However, those skilled in the art shall understand that the biometric further includes retina, eye wrinkle, cheilogramma, face and vein. The region of interest 13 refers to a region in which clear focusing can be maintained for imaging by the optical lens component, namely the optical lens component can perform clear imaging of a biometric located in a region of interest. The size of the region of interest 13 is determined according to the depth of focus of the optical lens component. Depth of focus refers to a difference between the nearest distance and the farthest distance at which the imaging system can maintain clear focusing. It decides the redundancy range of the user's distance to the biometric imaging device, or the range of application of biometric recognition. In addition, optical imaging theory is a known technology in the art, which will not be discussed here for conciseness.

The image sensor 120 is used for converting the optical image of the biometric as acquired by the optical lens component 110 into an electronic image.

Specifically, the image sensor 120 may comprise light sensitive elements such as a charge coupled device (CCD) and a metal oxide semiconductor device (CMOS), and converts the optical imaging of the biometric using a light sensitive element into an electronic signal so as to obtain a corresponding electronic image. In one embodiment, the electronic image comprises a static image and a dynamic image format. The dynamic image is a stream of static images formed by permutation and combination of multi-frame static images according to the time sequence, also called video format. The electronic image can be stored in a predetermined image format, including but not limited to BMP, JPEG, TIFF, RAW, GIF, PNG, etc. The information of the electronic image can also be saved in a characterizing form of binary bits in a buffer or memory. For example, each image pixel is represented with the binary information of 8 bits, 10 bits, 12 bits or 24 bits, and said information will serve as basic processing information for subsequent analysis, recognition, etc. of the biological image.

Those skilled in the art shall understand that the above method of converting the optical image into the electronic image is only an example. Other existing or possible conversion manners in the future, if applicable to the present invention, shall also be contained within the protection scope of the present invention, and incorporated herein by reference.

The micromotor controller 130 is used for acquiring, delivering or analyzing image (or video) quality characteristic information of the electronic image (comprising static image and dynamic image) converted by the image sensor 120, then analyzing in real time the biometric or definition of the image according to the image, video quality information of said electronic image, and adjusting the imaging component characteristics of the optical lens component 110 using the micromotor 140 so as to perform autofocus control of the biometric of said region of interest.

Specifically, the micromotor controller 130 can for example acquire an electronic image from the image sensor 120, and assess said electronic image to obtain image quality characteristic information of said electronic image, for example, the definition or biometric of the image. At the time of assessing the quality of the electronic image, it is possible to assess the entirety of the electronic image to obtain the entire image quality information of said electronic image; it is also possible to first recognize a biometric (such as iris) image contained in the electronic image, then assess the biometric image to obtain image quality information of said biometric and use it as image quality information of said electronic image. Said image quality information includes but is not limited to definition, contrast, average gray scale, image information entropy, interpupillary distance, pupil diameter, iris diameter, horizontal eye width, etc. of the image.

Figure 6:
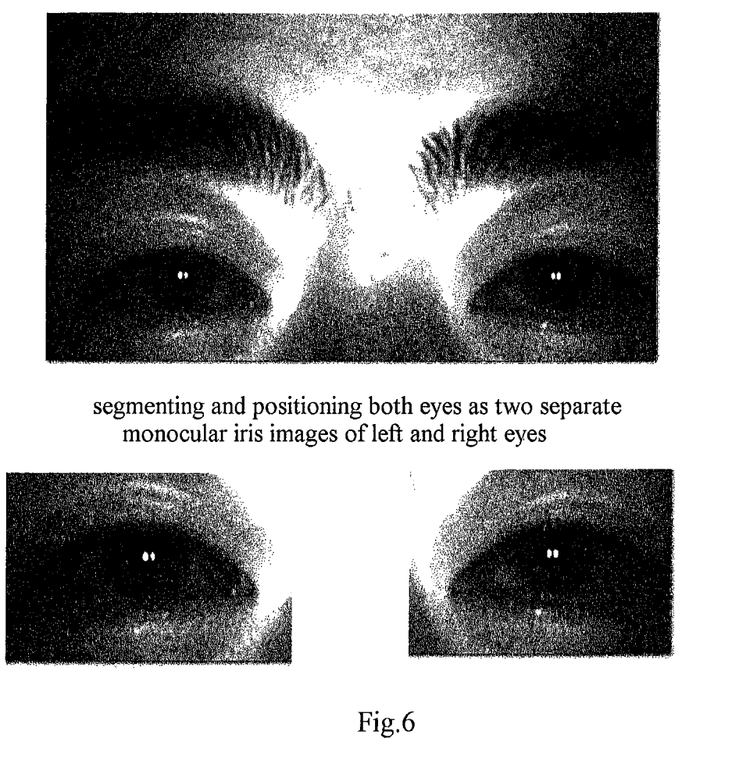
FIG. 6 shows a schematic diagram of segmentation and positioning of both eyes as two separate monocular iris images of left and right eyes according to an embodiment of the present disclosure.

For example, the micromotor controller 130 can rapidly locate a biometric region of interest, such as iris region of human eyes with respect to any frame of electronic image as acquired by the image sensor 120. Taking iris as an example, the micromotor controller 130 can perform simultaneous imaging of the regions of human eyes, and for each frame of the acquired image calculate in real time the central positions of pupils of human left and right eyes using an image processing algorithm to thereby realize real-time lookup and real-time location of irises of both eyes in the entire imaging image and cut out said imaging image into a monocular iris image of the left eye or right eye. As shown in FIG. 6, the image resolution is generally 640×480. The monocular iris image of the left eye or right eye obtained by image segmentation can be used as an analysis object for assessment of the definition of the image acquired by the biometric imaging device 100. Then, with respect to any monocular iris or irises of eyes, image analysis is performed on an image quality function (ImageQualityMetrics) thereof. The calculation of said function can be realized by means of a plurality of energy transfer functions F, including but not limited to Discrete Cosine Transform (DCT), Fast Fourier Transform (FFT) or Wavelet Transform (Wavelet), etc. The image quality information obtained by calculation may be an array of image quality parameters, and may also be a single image quality parameter including but not limited to definition, contrast, average gray scale, image information entropy, interpupillary distance, pupil diameter, iris diameter, etc. of the image.

It shall be noted that the above image processing algorithm for identifying the biometric from the electronic image may for example refer to the image processing process in the Chinese patent application CN102855476A. The whole document of this patent application will be cited herein as a part of the description. However, those skilled in the art shall appreciate that the above image processing manner is just an example, and other existing or possible image processing manners in the future, if applicable to the present invention, shall be also contained within the protection scope of the present invention and incorporated herein by reference.

Alternatively, the micromotor controller 130 may also send the electronic image to a third-party image quality assessment device (such as computer, processor, server, etc. which are not shown). Said third-party image quality assessment device receives and assesses said electronic image to obtain image quality information, and then feeds back said image quality information to the micromotor controller 130.

After obtaining the image quality information of the electronic image, the micromotor controller 130 may for example analyze the image quality information of the electronic image and the biometric information of the image, and thereby control the micromotor 140 to move the position of the optical lens component 110 or the optical lens therein, or change the optical properties such as optical curvature radius of the optical lens component 110. In this way, for example, the above process is repeated multiple times to achieve autofocus of the biometric of the region of interest. Specific implementation will be described in detail as follows.

The micromotor 140 is used for adjusting the optical lens component 110 by for example moving the position of the optical lens component 110 or the optical lens therein, or changing the optical properties such as optical curvature radius of the optical lens component 110 by for example changing the shape of the optical lens in the optical lens component 110.

Figure 4:
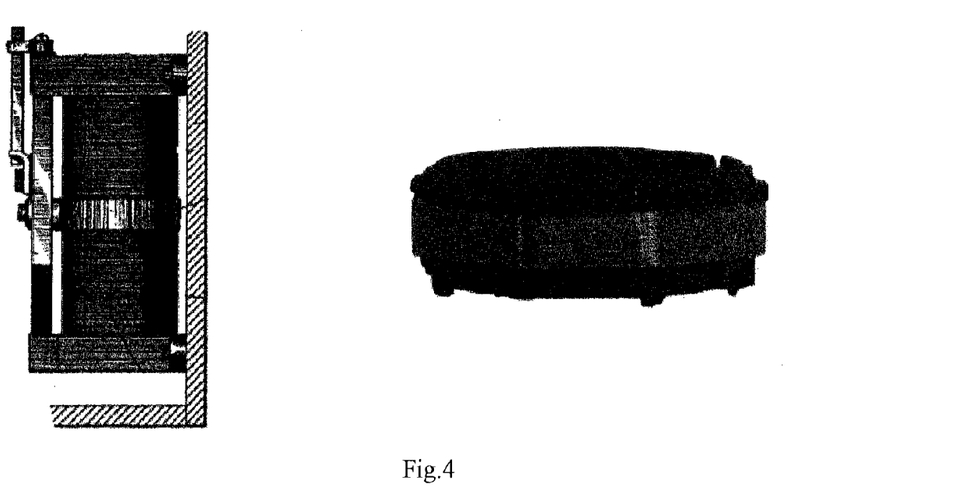
FIG. 4 shows a schematic diagram of a voice coil motor according to an embodiment of the present disclosure.

The micromotor 140 here may be a voice coil motor (VCM) as shown in FIG. 4, which is means for converting electric energy into mechanical energy. Specifically, the operation of the VCM comprises making current flow through electromagnetic (coils). This will produce an electromagnetic field that repels permanent magnets, as a result of which an optical lens clamper is vertically moved to make the optical lens far away from the image sensor. The VCM makes the optical lens close to the image sensor by means of restoring force provided by a spring, whereas the positions of other optical lens are infinitely focused.

When the biometric imaging device 100 is integrated on a thinner mobile terminal (such as mobile phone) with consideration of ensuring imaging quality, the VCM will become an obstacle to said purpose. Specifically, if it is to make a smaller VCM, a smaller coil, magnet and spring are required. As magnetic force is directly proportional to volume, smaller coils and magnets need more current to produce enough actuating force, leading to more serious problems in power consumption and overheat of the mobile terminal. Furthermore, smaller springs are more fragile, intensifying the problems in stroke hysteresis, lens tilt and reliability. Since the VCM is suffered from the problem of stroke hysteresis, the process of autofocus imaging with respect to the biometric region of interest (such as iris) becomes slow. Such problem becomes particularly prominent upon video capturing. In addition, high power consumption of the VCM will rapidly consume battery and heat produced thereby will also decrease the optical properties and imaging quality of the biometric imaging device.

Figure 5:
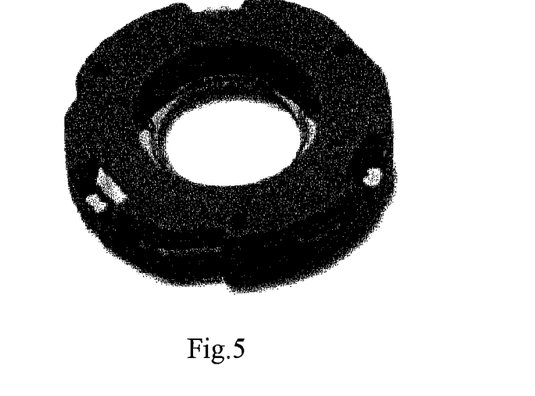
FIG. 5 shows a schematic diagram of a micro electromechanical system actuator according to an embodiment of the present disclosure.

In order to solve the above problems, the micromotor 140 may further employ a micro-electromechanical system (MEMS) actuator as shown in FIG. 5, the structure thereof comprises a micro-electromechanical mechanical actuator (consisting of a vertically movable housing-structured assembly, a spring providing restoring force and a electrostatic comb-like driver for controlling the housing-structured assembly) on the basis of a silicon wafer, and it is manufactured by semiconductor process and has mechanical and electronic characteristics. The comb-like driver is a pair of electrically conductive structures. When a direct voltage is applied, attractive force produced by electrostatic charges enables the comb-like drivers to be drawn together. By placing the optical lens in the center position, the biometric-based image processing algorithm will computationally combine with a precise position sensing location algorithm in a very short period of time, the silicon micro-electromechanical system autofocus actuator can control movement of the position(s) of any lens or multiple lenses in the set of optical lenses, while other lenses can be fixed at their optimal positions and remained motionless, thereby realizing efficient autofocus.

The micro-electromechanical system actuator, relative to the VCM, can integrate the three components (coil, magnet and spring) required in the VCM into a single assembly. It solves the problem of complicated physical connections among the three components of the VCM, makes the volume smaller, and reduces the impact of physical inertial stress among them, such that faster focusing can be achieved, which is 2 to 4 times faster than the control speed of focusing of a common VCM. Meanwhile, it is manufactured using semiconductor process, in particular lithography, so power consumption can be controlled to be lower.

Since it is possible to perform autofocus control on the biometric based on the image quality information of an electronic image of said biometric, the biometric imaging device of the present disclosure avoids traditional autofocus by measuring a physical distance between the imaging device and the photographed object, needless to configure hardware such as distance-measuring sensor required for distance measurement. In addition, said biometric imaging device employs a micromotor instead of a stepping motor or direct-current motor to adjust the optical lens component. These all provide the possibility of miniaturization of a biometric imaging device.

Alternatively, respective means of the biometric imaging device 100 are constantly working. Specifically, the optical lens component 110 performs optical imaging on a biometric of a region of interest; subsequently, the image sensor 120 converts the optical image of said biometric into an electronic image; then, the micromotor controller 130 acquires image quality information of the electronic image, and makes analysis according to the image quality information of the electronic image to thereby adjust the optical lens component. Herein, those skilled in the art shall understand that "constantly" means that the respective means respectively perform optical imaging on a biometric of a region of interest, convert the optical image into an electronic image, and make analysis according to the image quality information of the electronic image to adjust the optical lens component according to the requirement of the preset or real-time adjusted operation mode until desired focusing of said biometric is realized.

In one embodiment, the micromotor controller 130 obtains a step length for moving the optical lens component 110 according to the image quality information of the electronic image, and adjusts the position of the optical lens component 110 according to said step length, thereby moving a fixed imaging focal plane of the optical lens component 110 to achieve autofocus. Specifically, said step length includes the direction (e.g. moving forward or backward in the direction of facing the biometric) and distance of movement of the optical lens component 110.

For example, after obtaining the image quality information of the electronic image, the micromotor controller 130 performs comparative lookup between said image quality information and the experience lookup table of the whole optical imaging system (i.e. optical lens component 110), and whereby obtains the displacement state of the current optical imaging system, thereby obtaining displacement amount information required to change to reach a clear focusing and imaging state by means of the lookup table, i.e. step length. Thereafter, the micromotor controller 130 controls and rapidly adjusts the position of the imaging focal plane of said optical lens component according to said step length to perform autofocus control on the biometric of the region of interest.

For another example, after obtaining the image quality information of one frame of electronic image, the micromotor controller 130 may first control and rapidly adjust the position of the imaging focal plane of said optical lens component in one direction according to a predetermined step length to obtain another frame of electronic image, and obtain image quality information of said another frame of electronic image using the same method. Thereafter, the micromotor controller 130 compares the image quality information of the two frames of electronic image. If the quality of the frame image after adjustment is better than the quality of the frame image before adjustment, it indicates that focusing of the micromotor controller 130 is correct, and the movement by the predetermined step length is continued in this direction, otherwise, movement is performed in an opposite direction, which are repeated multiple times until image quality information meeting the requirement is obtained.

In order to make the biometric imaging device 100 more miniaturized, the space for moving the optical lens component 110 and the optical lens component 110 per se will become smaller. In this case, it is more difficult to achieve autofocus by moving the optical lens component or the optical lens therein. To solve said problem, in one embodiment, the optical lens component 110 in the biometric imaging device 100 is implemented as a liquid lens, and the micromotor controller 130 drives the micromotor 140 based on the image quality information of the electronic image to change the shape of said liquid lens, thereby adjusting the optical properties such as optical curvature radius of the optical lens component 110 to achieve autofocus. For example, after obtaining the image quality information of the electronic image, the microcontroller 130 performs comparative lookup between said image quality information and the experience lookup table of the whole optical imaging system (i.e. optical lens component 110), and whereby obtains the optical curvature state of the current optical imaging system, thereby obtaining a optical curvature radius required to change so as to reach a clear focusing and imaging state by means of the lookup table. Thereafter, the micromotor controller 130 drives the micromotor 140 according to said optical curvature radius to change the shape of the liquid lens, such that the optical lens component 110 has said corresponding optical property.

As known to those skilled in the art, the force needed for changing the shape of the optical lens so as to adjust its optical property is far smaller than that needed for moving the optical lens. This will save power consumption of the micromotor. As for a portable device, power consumption of the device is an important indicator to evaluate the applicability thereof. However, the biometric imaging device whose power consumption is low will meet said requirement, so it is suitable for being used separately as a portable device or integrated into other portable devices such as intelligent telephone.

Alternatively, in one embodiment, the micromotor controller 130 may determine from the electronic image a specific physical attribute of the biometric which has a relatively objective constant value, acquire an attribute value of said specific physical attribute in the electronic image as image quality information of the electronic image, and then adjust said optical lens component based on said attribute value so as to perform autofocus control of the biometric of the region of interest.

Specifically, the micromotor controller 130 may first locate a biometric in the electronic image by means of the aforesaid image analysis algorithm, and query according to said biometric, for example in a biometric specific attribute list, a specific physical property corresponding to said biometric which has a relatively objective constant value. The "relatively objective constant value" here indicates that the value of the specific physical attribute of the biometric changes very little in the objective world and does not greatly vary with different hosts of the biometric. For example, when the biometric in the electronic image is human irises of eyes (i.e. the electronic image comprises human eyes), a specific attribute corresponding to irises of eyes can be obtained as the interpupillary distance p by inquiry (as shown in FIG. 1), because the interpupillary distance p among the normal human beings changes very little and can be regarded as constant.

After determining the specific physical attribute of the biometric, since the photoelectric transfer function of the biometric imaging device 100 is known, the micromotor controller 130 may calculate the attribute value of said specific physical attribute in the electronic image. For example, the micromotor controller 130 may calculate the pixel distance value p' of the human interpupillary distance in the electronic image.

Thereafter, the micromotor controller 130 may obtain based on calculation the attribute value of the specific physical attribute in the electronic image, such as the pixel distance value p' of the interpupillary distance, and calculate an object distance D between the biometric of the region of interest 13 and the biometric imaging device 100, e.g. the distance between the human eye iris plane 12 and the optical lens component 110 or image sensor 120. For example, since the optical property parameters of the optical lens component 110 are known, the optical angle of view 11 thereof is known, and the human interpupillary distance p is substantially constant and change thereof has small impact on calculation of the object distance D, the object distance D can be regarded as inversely proportional to the pixel distance value p' of the human interpupillary distance, namely the larger the pixel distance value p' of the human interpupillary distance as obtained by analysis and calculation is, the smaller (nearer) the distance from the human eyes to the imaging device 100 is; the smaller the pixel distance value p' of the human interpupillary distance as obtained by analysis and calculation is, the larger (farther) the distance from the human eyes to the imaging device 100 is. Therefore, it is possible to calculate the object distance D by means of the aforesaid transfer function F, i.e.

$$D=F(p')$$

Moreover, such transfer function F change very little with respect to different adults, thus it can be regarded as an empirical function which is constant and generally applicable to adults.

Thereafter, the micromotor controller 130 may make comparison between the distance object D obtained by calculation and the current imaging focal distance $f_d$ of the optical lens component 110 and thereby purposely adjust said optical lens component 110 so as to realize autofocus. For example, the micromotor controller 130 may calculate a difference between the distance object D and the imaging focal distance $f_d$, i.e. L (L=D-$f_d$), wherein L is a focusing vector required to move so as to enable the optical lens component 110 to perform clear imaging of the biometric of the region of interest, thus the step length for moving the optical lens component 110 is L. In this case, the micromotor controller 130 may drive the micromotor according to said step length to move the optical lens component 110 to an appointed position to complete autofocus. Alternatively, for example, when the optical lens set of the optical lens component 110 comprises a liquid lens, the micromotor controller 130 may adjust the optical curvature radius of the liquid lens by driving the micromotor 140 to change the shape of said liquid lens, such that the value of the new imaging focal distance $f_d$ of the optical lens component 110 after change approaches the object distance D, thereby achieving autofocus.

Figure 2:
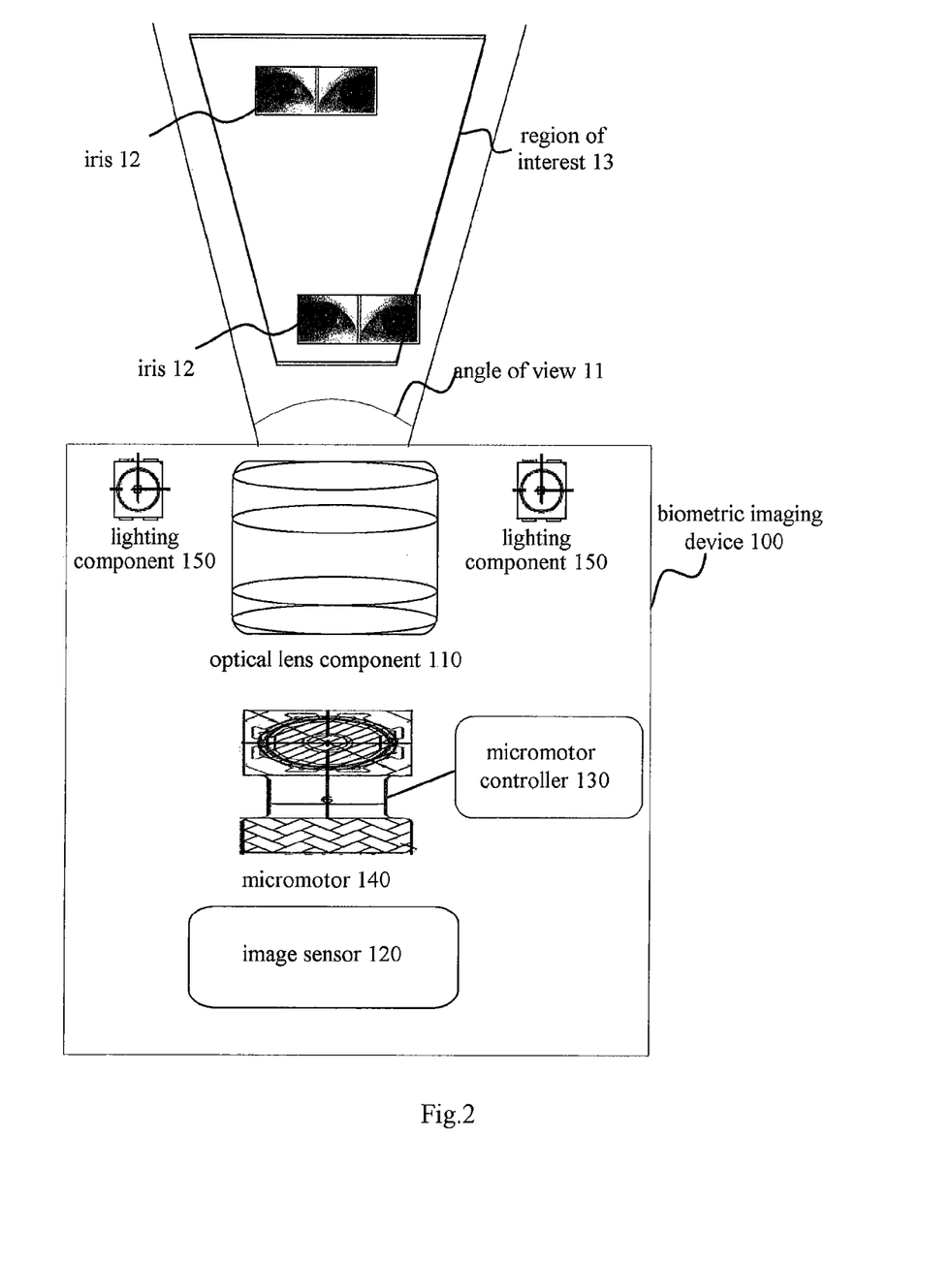
FIG. 2 shows a schematic diagram of a biometric imaging device according to another aspect of the present disclosure.

Alternatively, as shown in FIG. 2, the biometric imaging device 100 may further comprise one or more lighting components 150 for illuminating the region of interest at the time of optical imaging of the biometric of the region of interest, so as to enhance the brightness of the acquired image.

The lighting components 150 may for example be light emitting diodes (LED), and may also be other types of lighting devices. Moreover, the lighting components 150 may employ visible light or near infrared light for illumination. The lighting components 150 may be placed on the biometric imaging device 100 at equal distance from the optical lens component 110, and may also be randomly placed at 360 degrees surrounding the optical lens component 110.

The center spectrum of light emitted from the lighting component 150 can be set according to a specific biometric to be imaged. For example, if the biometric is iris, the center spectrum of the near infrared employed ranges from 700 nm to 950 nm.

Further, when performing imaging of human iris, since the iris features (such as color) of different human species are different, in order to perform clear imaging of irises of different species, it is possible to use lighting components with different center spectrums for illuminating them. For example, the biometric imaging device 100 comprises three LED lamps emitting near infrared light, and the center spectrum of the near infrared light emitted by each LED lamp is respectively 780 nm, 850 nm and 940 nm, so as to illuminate different human species' irises with deep and light colors for better imaging.

In one embodiment, the biometric imaging device 100 may perform imaging of a monocular iris, and may also perform simultaneous imaging of irises of both eyes.

For example, if it is required to perform clear imaging of the monocular iris for iris recognition, the optical resolution of the optical lens component 110 in the horizontal direction of the eye has to be higher than or equal to 640 pixels, and has to be higher than or equal to 480 pixels in the vertical direction. Accordingly, the image resolution of the image sensor 120 has to be higher than or equal to the optical resolution of the optical lens component.

If it is required to perform clear imaging of the irises of both eyes for recognition of irises of both eyes, the optical resolution of the optical lens component 110 in the horizontal direction of eyes has to be higher than or equal to 1500 pixels, and has to be higher than or equal to 480 pixels in the vertical direction, thereby ensuring the optical resolution of each monocular image. Accordingly, the image resolution of the image sensor 120 has to be higher than or equal to the optical resolution of the optical lens component.

Alternatively, the biometric imaging device 100 further comprises an optical filter (not shown) which is located between the biometric to be imaged and the optical lens component to filter light entering the optical lens component 110, thereby reducing impact of the external environment on imaging of the biometric, in particular outdoor sunlight, stray light, lamplight and dark environment.

Figure 3:
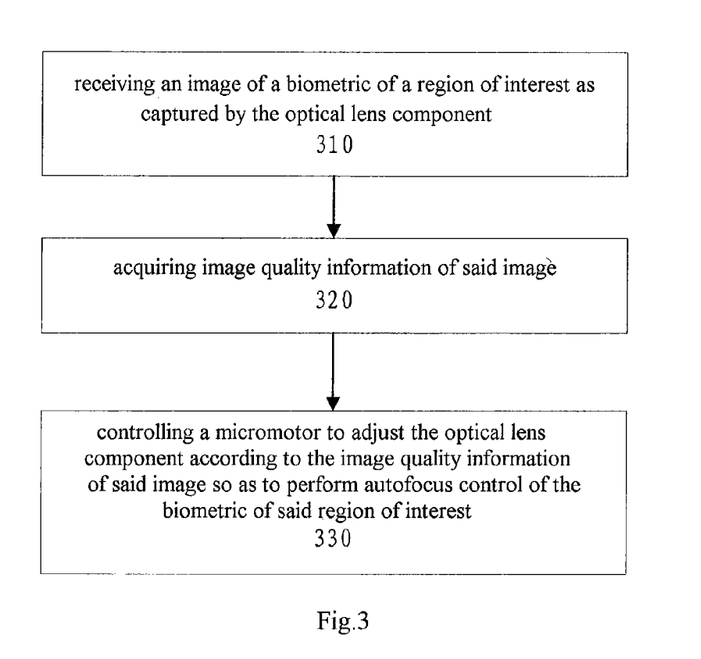
FIG. 3 shows a flow diagram of a biometric imaging method according to one aspect of the present disclosure.

FIG. 3 shows a flow diagram of a biometric imaging method according to one aspect of the present disclosure.

The processing process of said biometric imaging method is now described as follows by reference to FIG. 1 and FIG. 3.

In step 310, the biometric imaging device 100 acquires an image of the biometric of the region of interest as captured by the optical lens component.

For example, the biometric imaging device 100 may utilize an optical lens component such as a set of optical lenses to perform optical imaging on the biometric of the region of interest. The materials of the set of optical lenses may employ all-glass lens, all-plastic lens, and mixed material such as a combination of glass lens and plastic lens or liquid lens. Herein, iris is used as an example of the biometric to describe the embodiments of the present disclosure. However, those skilled in the art shall understand that the biometric further includes retina, eye wrinkle, cheilogramma, face and vein. The region of interest refers to a region in which clear focusing can be maintained for imaging, namely the biometric imaging device 100 can perform clear imaging of a biometric located in a region of interest. Alternatively, when performing optical imaging of the biometric of the region of interest, it is possible to employ visible light or near infrared light for illuminating the photographed object so as to obtain higher optical imaging quality.

Subsequently, the biometric imaging device 100 may utilize light sensitive elements such as a charge coupled device (CCD) and a metal oxide semiconductor device (CMOS) to convert the optical imaging of the biometric into an electronic signal so as to obtain a corresponding electronic image. Said electronic image is namely an image of the biometric to be acquired. In one embodiment, the electronic image comprises a static image and a dynamic image format. The dynamic image is a stream of static images formed by permutation and combination of multi-frame static images according to the time sequence, also called video format. The electronic image can be stored in a predetermined image format, including but not limited to BMP, JPEG, TIFF, RAW, GIF, PNG, etc. The information of the electronic image can also be saved in a buffer or internal memory in a characterizing form of binary bits. For example, each image pixel is represented with the binary information of 8 bits, 10 bits, 12 bits or 24 bits, and said information will serve as basic processing information for subsequent analysis, recognition, etc. of the biological image.

Those skilled in the art shall understand that the above method of converting the optical image into the electronic image is only an example. Other existing or possible conversion manners in the future, if applicable to the present invention, shall also be contained within the protection scope of the present invention, and incorporated herein by reference.

Those skilled in the art shall understand that the above manner of acquiring the image of the biometric of the region of interest is only an example. Other existing or possible conversion manners in the future, if applicable to the present invention, shall also be contained within the protection scope of the present invention, and incorporated herein by reference.

In step 320, the biometric imaging device 100 acquires image (or video) quality information of the image (including static image and dynamic image) of the biometric as acquired in step 310. For example, the biometric imaging device 100 may assess the entirety of the electronic image to obtain the integral image quality information of said electronic image; and may also first identify the biometric (such as iris) image contained in the electronic image, then assess said biometric image to obtain image quality information of said biometric, and use it as image quality information of said electronic image. Said image quality information includes but is not limited to definition, contrast, average gray scale, image information entropy, etc. of the image.

For example, as for any frame of electronic image as acquired, the biometric imaging device 100 can rapidly locate a biometric region of interest, such as iris regions of human eyes. Taking iris as an example, the biometric imaging device 100 can perform simultaneous imaging of regions of human eyes, and for each frame of the acquired image calculate in real time the central positions of pupils of human left and right eyes using an image processing algorithm to thereby realize real-time lookup and real-time location of irises of both eyes in the entire imaged image and cut out said imaged image into a monocular iris image of the left eye or right eye. As shown in FIG. 6, the image resolution is generally 640×480. The monocular iris image of the left eye or right eye obtained by image segmentation can be used as an analysis object for assessment of the definition of the image acquired by the biometric imaging device 100. Then, with respect to any monocular iris or irises of eyes, image analysis is performed on an image quality function (ImageQualityMetrics) thereof. The calculation of said function can be realized by means of a plurality of energy transfer functions, including but not limited to Discrete Cosine Transform (DCT), Fast Fourier Transform (FFT) or Wavelet Transform (Wavelet), etc. The image quality information obtained by calculation may be an array of image quality parameters, and may also be a single image quality parameter including but not limited to definition, contrast, average gray scale, image information entropy, interpupillary distance, etc. of the image.

In step 330, the biometric imaging device 100 adjusts the characteristics of the optical lens component using a micromotor device according to the image (or video) quality information of said electronic image so as to perform autofocus control of the biometric of the region of interest.

For example, after obtaining the image quality information of the electronic image, the biometric imaging device 100 may for example analyze the image quality information of the electronic image, and whereby drive the micromotor to produce electromagnetic force to move the position of the optical lens component or change the optical properties such as optical curvature radius thereof, thereby achieving autofocus of the biometric of the region of interest. Specific implementation will be described in detail as follows.

The micromotor here may be a voice coil motor (VCM) as shown in FIG. 4, which is means for converting electric energy into mechanical energy. Specifically, the operation of the VCM comprises making current flow through electromagnetic (coils). This will produce an electromagnetic field that repels permanent magnets, as a result of which an optical lens clamper is vertically moved to make the optical lens far away from the image sensor. The VCM makes the optical lens close to the image sensor by means of restoring force provided by a spring, whereas the positions of other optical lens are infinitely focused.

When the biometric imaging device 100 is integrated on a thinner mobile terminal (such as mobile phone) with consideration of ensuring imaging quality, the VCM will become an obstacle to said purpose. Specifically, if it is to make a smaller VCM, a smaller coil, magnet and spring are required. As magnetic force is directly proportional to volume, smaller coils and magnets need more current to produce enough actuating force, leading to more serious problems in power consumption and overheat of the mobile terminal. Furthermore, smaller springs are more fragile, intensifying the problems in stroke hysteresis, lens tilt and reliability. Since the VCM is suffered from the problem of stroke hysteresis, the process of autofocus becomes slow. Such problem becomes particularly prominent upon video capturing. In addition, high power consumption of the VCM will rapidly consume battery and heat produced thereby will also decrease the optical properties and imaging quality of the biometric imaging device.

In order to solve the above problems, the micromotor may further employ a micro-electromechanical (MEMS) system actuator as shown in FIG. 5, the structure thereof comprises a micro-electromechanical mechanical actuator (consisting of a vertically movable housing-structured assembly, a spring providing restoring force and a electrostatic comb-like driver for controlling the housing-structured assembly) on the basis of a silicon wafer, and it is manufactured by semiconductor process and has mechanical and electronic characteristics. The comb-like driver is a pair of electrically conductive structures. When a direct voltage is applied, attractive force produced by electrostatic charges enables the comb-like drivers to be drawn together. By placing the optical lens in the center position, the biometric-based image processing algorithm will computationally combine with a precise position sensing location algorithm in a very short period of time, the silicon micro-electromechanical system autofocus actuator can control movement of the position(s) of any lens or multiple lenses in the set of optical lenses, while other lenses can be fixed at their optimal positions and remained motionless, thereby realizing efficient autofocus.

The micro-electromechanical system actuator, relative to the VCM, can integrate the three components (coil, magnet and spring) required in the VCM into a single assembly. It solves the problem of complicated physical connections among the three components of the VCM, makes the volume smaller, and reduces the impact of physical inertial stress among them, such that faster focusing can be achieved, which is 2 to 4 times faster than the control speed of common VCM focusing. Meanwhile, it is manufactured using semiconductor process, in particular lithography, so power consumption can be controlled to be lower.

Since it is possible to perform autofocus control on the biometric based on the image quality information of an electronic image of said biometric, the biometric imaging device of the present disclosure avoids traditional autofocus by measuring a physical distance between the imaging device and the photographed object, needless to configure hardware such as distance-measuring sensor required for distance measurement. In addition, said biometric imaging device employs a micromotor instead of a stepping motor or direct-current motor to adjust the optical lens component. These all provide the possibility of miniaturization of a biometric imaging device.

In one embodiment, the biometric imaging device 100 obtains a step length for moving the optical lens component 110 according to the image quality information of the electronic image, and adjusts the position of the optical lens component according to said step length to thereby move a fixed imaging focal plane of the optical lens component to achieve autofocus. Said step length includes the direction (e.g. moving forward or backward in the direction of facing the biometric) and distance of movement of the optical lens component.

For example, after obtaining the image quality information of the electronic image, the biometric imaging device 100 performs comparative lookup between said image quality information and the experience lookup table of the whole optical imaging system, and whereby obtains the displacement state of the current optical imaging system, thereby obtaining displacement amount information required to change to reach a clear focusing and imaging state by means of the lookup table, i.e. step length. Thereafter, the biometric imaging device 100 controls and rapidly adjusts the position of the imaging focal plane of said optical lens component according to said step length to perform autofocus control on the biometric of the region of interest.

For another example, after obtaining the image quality information of one frame of electronic image, the biometric imaging device 100 may first control and rapidly adjust the position of the imaging focal plane of said optical lens component in one direction according to a predetermined step length to obtain another frame of electronic image, and obtain image quality information of said another frame of electronic image using the same method. Thereafter, the biometric imaging device 100 compares the image quality information of the two frames of electronic image. If the quality of the frame image after adjustment is better than the quality of the frame image before adjustment, it indicates that focusing of the biometric imaging device 100 is correct, and the movement by the predetermined step length is continued in this direction, otherwise movement is performed in an opposite direction, which are repeated multiple times until image quality information meeting the requirement is obtained.

In order to make the biometric imaging device 100 more miniaturized, the space for moving the optical lens component will become smaller. In this case, it is more difficult to achieve autofocus by moving the optical lens component.

To solve said problem, in one embodiment, the optical lens component in the biometric imaging device 100 is implemented as a liquid lens, and the micromotor is driven based on the image quality information of the electronic image to change the shape of said liquid lens, thereby adjusting the optical properties such as optical curvature radius of the optical lens component to achieve autofocus. For example, after obtaining the image quality information of the electronic image, the biometric imaging device 100 performs comparative lookup between said image quality information and the experience lookup table of the whole optical imaging system, and whereby obtains the optical curvature state of the current optical imaging system, thereby obtaining a optical curvature radius required to change so as to reach a clear focusing and imaging state by means of the lookup table. Thereafter, the biometric imaging device 100 drives the micromotor according to said optical curvature radius to change the shape of the liquid lens, such that the optical lens component 110 has said corresponding optical property.

As known to those skilled in the art, the force needed for changing the shape of the optical lens so as to adjust its optical property is far smaller than that needed for moving the optical lens. This will save power consumption of the micromotor. As for a portable device, power consumption of the device is an important indicator to evaluate the applicability thereof. However, the biometric imaging device whose power consumption is low will meet said requirement, so it is suitable for being used separately as a portable device or integrated into other portable devices such as intelligent telephone.

Alternatively, in one embodiment, the biometric imaging device 100 may determine from the biometric-containing image a specific physical attribute of the biometric which has a relatively objective constant value, acquire an attribute value of said specific physical attribute in the image as image quality information of said image, and then adjust said optical lens component based on said attribute value so as to perform autofocus control of the biometric of the region of interest.

Specifically, the biometric imaging device 100 may first locate a biometric in the electronic image by means of the aforesaid image analysis algorithm, and query according to said biometric, for example in a biometric specific attribute list, a specific physical property corresponding to said biometric which has a relatively objective constant value. The "relatively objective constant value" here indicates that the value of the specific physical attribute of the biometric changes very little in the objective world and does not greatly vary with different hosts of the biometric. For example, when the biometric in the image is human irises of eyes (i.e. the image comprises human eyes), a specific attribute corresponding to irises of eyes can be obtained as the interpupillary distance p by inquiry (as shown in FIG. 1), because the interpupillary distance p among the normal human beings changes very little and can be regarded as constant.

After determining the specific physical attribute of the biometric, since the photoelectric transfer function of the biometric imaging device 100 is known, the biometric imaging device 100 may calculate the attribute value of said specific physical attribute in the electronic image. For example, the biometric imaging device 100 may calculate the pixel distance value p' of the human interpupillary distance in the electronic image.

Thereafter, the biometric imaging device 100 may obtain based on calculation the attribute value of the specific physical attribute in the electronic image, such as the pixel distance value p' of the interpupillary distance, and calculate an object distance D between the biometric of the region of interest and the biometric imaging device 100, e.g. the distance between the human eye iris plane and the optical lens component. For example, since the optical property parameters of the optical lens component are known, the optical angle of view thereof is known, and the human interpupillary distance p is substantially constant and change thereof has small impact on calculation of the object distance D, the object distance D can be regarded as inversely proportional to the pixel distance value p' of the human interpupillary distance, and it is possible to calculate the object distance D by means of the aforesaid energy transfer function F, i.e.

$$D=F(p')$$

Thereafter, the biometric imaging device 100 may adjust the optical lens component according to the distance object D obtained by calculation and the current imaging focal distance $f_d$ of the optical lens component so as to realize autofocus. For example, the biometric imaging device 100 may calculate a difference between the distance object D and the imaging focal distance $f_d$, i.e. L (L=D−$f_d$), wherein L is a focusing vector required to move to enable the optical lens component to perform clear imaging of the biometric of the region of interest, thus the step length for moving the optical lens component is L. In this case, the biometric imaging device 100 may drive the micromotor according to said step length L to move the optical lens component to an appointed position so as to complete autofocus. Alternatively, for example, when the optical lens set of the optical lens component comprises a liquid lens, the biometric imaging device 100 may adjust the optical curvature radius of the liquid lens by driving the micromotor to change the shape of said liquid lens, such that the value of the imaging focal distance fd of the optical lens component approaches the object distance D, thereby completing autofocus.

Owing to the advantages such as small volume and fast recognition speed, the abovementioned biometric imaging device can be integrated into mobile terminals such as intelligent mobile phone, tablet computer, ultrabook, notebook computer, intelligent wearable device, and so on, thereby providing various convenient applications.

For those skilled in the art, the present invention is obviously not limited to the details of the aforesaid exemplary examples and can be carried out in other specific forms without departing from the spirit or basic features thereof. Therefore, the examples shall be considered to be exemplary and non-limiting no matter how they are understood. The scope of the present invention is defined by the claims as enclosed instead of the above description. Therefore, all the variations intended to fall within the meanings and scopes of equivalent essentials in the claims are encompassed in the present invention. Any reference sign in the claims shall not be regarded as limitation to said claims. In addition, the word "comprise" apparently does not exclude other units or steps, and the singular form does not exclude the plural form. Multiple units or means stated in the apparatus claim can also be implemented by one unit or means by means of software or hardware. The words such as first, second and the like are used to represent names rather than representing any specific order.

The invention claimed is:

1. A biometric imaging device (100), comprising:
   an optical lens component (110) for performing optical imaging on a biometric (12) in a region of interest (13);
   an image sensor (120) for converting an optical image comprising said biometric (12) into an electronic image;
   a micromotor (140) for adjusting said optical lens component (110);
   a micromotor controller (130) for acquiring image quality information of said electronic image, and controlling said micromotor (140) to adjust said optical lens component (110) according to the image quality information of said electronic image so as to perform autofocus control of the biometric (12) of said region of interest (13), wherein the image quality information comprises at least one of contrast, average gray scale, image information entropy, pupil diameter, iris diameter, and horizontal eye width; and
   at least one lighting component (150) that employs near infrared light having different center spectrums of 780 nm, 850 nm and 940 nm respectively for illuminating.

2. The device according to claim 1, wherein said micromotor is a voice coil motor or a micro-electromechanical system actuator, said micromotor is further configured to adjust said optical lens component (110) using electromagnetic force produced thereby so as to perform autofocus control of the biometric (12) of said region of interest (13).

3. The device according to claim 1, wherein said micromotor controller (130) is further configured to obtain a step length for moving said optical lens component (110) according to the image quality information of said electronic image, and adjust the position of said optical lens component (110) according to said step length so as to achieve autofocus.

4. The device according to claim 1, wherein said optical lens component (110) comprises a liquid lens, said micromotor controller (130) is further configured to change the shape of said liquid lens according to the image quality information of said electronic image so as to adjust optical properties of said optical lens component (110) to achieve autofocus.

5. The device according to claim 1, wherein said micromotor controller is further configured to determine from said electronic image a specific physical attribute of said biometric which has a relatively constant value, acquire an attribute value of said specific physical attribute in said electronic image as image quality information of said electronic image, and adjust said optical lens component (110) according to said attribute value so as to perform autofocus control of the biometric (12) of said region of interest (13).

6. The device according to claim 5, wherein said micromotor controller is further configured to calculate an object distance between the biometric of said region of interest and said biometric imaging device (100) based on said attribute value, and adjust said optical lens component (110) according to said object distance and the current imaging focal distance of said optical lens component (110) so as to achieve autofocus.

7. The device according to claim 6, wherein said micromotor controller is further configured to calculate a difference between said object distance and said imaging focal distance so as to obtain a step length for moving said optical lens component (110), and adjust the position of said optical lens component (110) according to said step length so as to achieve autofocus.

8. The device according to claim 6, wherein said optical lens component (110) comprises a liquid lens, wherein said micromotor controller is further configured to change the shape of said liquid lens according to said object distance and said imaging focal distance so as to adjust optical properties of said optical lens component (110) to achieve autofocus.

9. The device according to claim 5, wherein when said biometric comprises irises of both eyes, said micromotor controller is further configured to determine from said electronic image an interpupillary distance of said irises of both eyes as said specific physical attribute.

10. The device according to claim 1, wherein when said biometric comprises irises of both eyes, the optical resolution of said optical lens component (110) in a horizontal direction of eyes is higher than or equal to 1500 pixels, the optical resolution thereof in a vertical direction is higher than or equal to 480 pixels, and the resolution of said image sensor (120) is higher than or equal to the optical resolution of said optical lens component (110).

11. The device according to claim 1, wherein when said biometric comprises a monocular iris, the optical resolution of said optical lens component (110) in a horizontal direction of eyes is higher than or equal to 640 pixels, the optical resolution thereof in a vertical direction is higher than or equal to 480 pixels, and the resolution of said image sensor (120) is higher than or equal to the optical resolution of said optical lens component (110).

12. The device according to claim 1, said device further comprising an optical filter for filtering light entering said optical lens component (110).

13. The device according to claim 1, wherein said biometric comprises at least one selected from the group consisting of iris, retina, eye wrinkle, cheilogramma, face and vein.

14. A mobile terminal, said mobile terminal comprising a biometric imaging device according to claim 1.

15. A biometric imaging method, comprising:
    acquiring an image (310) of a biometric of a region of interest as captured by an optical lens component;

acquiring image quality information (320) of said image;

controlling a micromotor to adjust the optical lens component according to the image quality information of said image so as to perform autofocus control (330) of the biometric (12) of said region of interest (13), wherein the image quality information comprises at least one of contrast, average gray scale, image information entropy, pupil diameter, iris diameter, and horizontal eye width; and further comprises:

employing near infrared light having different center spectrums of 780 nm, 850 nm and 940 nm respectively for illuminating.

16. The method according to claim 15, wherein said micromotor is a voice coil motor or a micro electromechanical system actuator, wherein said autofocus control comprises adjusting said optical lens component using electromagnetic force generated by said micromotor.

17. The method according to claim 15, wherein said autofocus control comprises obtaining a step length for moving said optical lens component according to the image quality information of said image, and adjusting the position of said optical lens component according to said step length so as to achieve autofocus.

18. The method according to claim 15, wherein said optical lens component comprises a liquid lens, wherein said autofocus control comprises changing the shape of said liquid lens according to the image quality information of said image so as to adjust optical properties of said optical lens component to achieve autofocus.

19. The method according to claim 15, wherein said step (320) of acquiring image quality information comprises: determining from said image a specific physical attribute of said biometric which has a relatively constant value, and acquiring an attribute value of said specific physical attribute in said image as image quality information of said image.

20. The method according to claim 19, wherein said step (330) of adjusting said optical lens component comprises: calculating an object distance between the biometric of said region of interest and said optical lens component based on said attribute value, and adjusting said optical lens component according to said object distance and the current imaging focal distance of said optical lens component so as to achieve autofocus.

21. The method according to claim 20, wherein said step of adjusting said optical lens component according to said object distance and said imaging focal distance comprises: calculating a difference between said object distance and said imaging focal distance so as to obtain a step length for moving said optical lens component, and adjusting the position of said optical lens component according to said step length so as to achieve autofocus.

22. The method according to claim 20, wherein said optical lens component comprises a liquid lens, said step of adjusting said optical lens component according to said object distance and said imaging focal distance comprises: changing the shape of said liquid lens according to said object distance and said imaging focal distance so as to adjust optical properties of said optical lens component to achieve autofocus.

23. The method according to claim 19, wherein when said biometric comprises irises of both eyes, said step of determining a specific physical attribute of said biometric comprises: determining from said image an interpupillary distance of said irises of both eyes as said specific physical attribute.

24. A computer program product, stored in a non-transitory computer readable storage medium, comprising instructions which, when said instructions are loaded on a computing device and executed thereon, cause said computing device to perform the method according to claim 15.

25. A non-transitory computer readable storage medium storing instructions which, when said instructions are loaded on a computing device and executed thereon, cause said computing device to perform the method according to claim 15.

* * * * *

UNITED STATES PATENT AND TRADEMARK OFFICE
CERTIFICATE OF CORRECTION

| | | |
|---|---|---|
| PATENT NO. | : 9,852,338 B2 | Page 1 of 1 |
| APPLICATION NO. | : 14/648368 | |
| DATED | : December 26, 2017 | |
| INVENTOR(S) | : Xiaopeng Wang | |

It is certified that error appears in the above-identified patent and that said Letters Patent is hereby corrected as shown below:

On the Title Page

Item (30) Foreign Application Priority Data: Please correct "2013 1 0494298" to read -- 2013 1 0494298.1 --

Signed and Sealed this
Twenty-ninth Day of May, 2018

Andrei Iancu
*Director of the United States Patent and Trademark Office*